Patented Feb. 27, 1934

1,949,243

UNITED STATES PATENT OFFICE 1,949,243

PRODUCTION OF ALPHA NAPHTHOL

William J. Cotton, Buffalo, N. Y., assignor to National Aniline & Chemical Company, Inc., New York, N. Y., a corporation of New York No Drawing. Application November 9, 1929
Serial No. 406,152

21 Claims. (Cl. 260—154)

This invention relates to a process for the production of alpha-naphthol (1-naphthol), and more particularly to a process which includes the conversion of 1-naphthalenemonosulfonic acid to 1-naphthol by an alkali fusion, and includes improvements in the separation of 1-naphthol from a naphthol sulfonic acid.

When naphthalene is sulfonated with sulfuric acid for the production of 1-naphthalenemonosulfonic acid in accordance with heretofore practiced processes, naphthalene disulfonic acid, or acids are generally produced in addition.

An object of the invention is to provide a process for the production of 1-naphthol from a mixture containing 1-naphthalenemonosulfonic acid and a naphthalene disulfonic acid which gives a product of high quality in good yield and which may be practiced on a commercial scale with economy and facility.

Other objects of the invention are to fuse a mixture containing 1-naphthalenemonosulfonic acid and a naphthalene disulfonic acid with a caustic alkali under such conditions that the alkali-metal compounds of 1-naphthol and of naphthol sulfonic acid are formed, and to separate the 1-naphthol in a relatively pure condition from the mixture.

Other objects of the invention will in part be obvious and will in part appear hereinafter.

The invention accordingly comprises the several steps and the relation of one or more of such steps with respect to each of the others thereof which will be exemplified in the process hereinafter disclosed, and the scope of the invention will be indicated in the claims.

In the practice of the invention a mixture of 1-naphthalenemonosulfonic acid and a naphthalene disulfonic acid may be fused with a caustic alkali to form a mixture of the alkali-metal compounds of 1-naphthol and of a naphthol sulfonic acid, and the 1-naphthol may be liberated from the mixture of alkali-metal compounds while leaving the naphthol sulfonic acid in solution.

The fusion in accordance with a preferred method of procedure may be accomplished by heating a mixture of 1-naphthalenemonosulfonic acid and a naphthalene disulfonic acid under pressure in an autoclave with an excess of caustic alkali whereby the 1-naphthalenemonosulfonic acid is converted to an alkali-metal 1-naphtholate while the naphthalene disulfonic acid is wholly or partly converted to an alkali-metal compound of naphthol monosulfonic acid. The mixture of 1-naphthalenemonosulfonic acid and disulfonic acid employed may be any suitable mixture obtained by any suitable method, such as the process described in my co-pending application, Serial No. 406,151, filed of even date herewith, for Production of alpha naphthol and may contain several naphthalene disulfonic acids which may be substituted either in the alpha and/or in the beta positions. The said mixture of naphthalene sulfonic acids may also contain 2-naphthalenemonosulfonic acid; but if it is desired to produce 1-naphthol which is free from 2-naphthol, the mixture of naphthalene sulfonic acids should be substantially free from 2-naphthalenemonosulfonic acid.

The caustic alkali (e. g., sodium hydroxide, potassium hydroxide, or a mixture thereof) is preferably employed in such a proportion relative to the mixture of naphthalene sulfonic acids that there is present in the melt at least a sufficient excess of caustic alkali to form a flux and render the melt capable of being agitated at the reaction temperature while yet avoiding so great an excess of caustic alkali as to convert the naphthalene disulfonic acid to the dihydroxy compound. The fusion may be carried out at a temperature of 275° to 310° C. A temperature not exceeding 285° C. is preferred, however, and the reaction is preferably carried out at said temperature for a minimum reaction period of about 5½ to 6 hours. Upon completion of the fusion, 1-naphthol may be isolated from the fusion mixture.

The separation of the 1-naphthol may be effected by dissolving in water the fusion mass resulting from the alkali fusion of the mixture of naphthalene sulfonic acids, and containing alkali-metal 1-naphtholate together with alkali-metal compounds of the naphthol sulfonic acid, or acids; and isolating 1-naphthol from the resulting solution, preferably after a filtration to remove insoluble impurities, by converting the alkali-metal 1-naphtholate to 1-naphthol while leaving the naphthol sulfonic acid, or acids, and any unconverted disulfonic acid in solution in the form of their alkali-metal salts, and separating the 1-naphthol from the remaining solution. This is preferably brought about by selectively acidifying the mixture of the alkali-metal 1-naphtholate and the alkali-metal compounds of naphthol sulfonic acid, or acids, by the employment of an amount of a suitable mineral acid substantially such that the alkali-metal 1-naphtholate and the alkali-metal compound, or compounds, of the naphthol sulfonic acid, or acids, are converted to 1-naphthol and the monoalkali-metal salt, or salts, of naphthol sulfonic acid, or acids. The 1-naphthol, which is insoluble, may then be separated from the monoalkali-metal salt or salts of the sulfonic acid, or acids, sodium sulfite, unreacted sodium sulfonate, etc. (which are all soluble) by filtration, decantation, centrifuging, etc.

There is thus obtained from a mixture of 1-naphthalenemonosulfonic acid with one or more naphthalene disulfonic acids, 1-naphthol substantially free from dinaphthols and from naphthol sulfonic acid.

As an illustrative embodiment of a manner in which the invention may be practiced the following example is presented. The parts are by weight.

Example 250 parts of a mixture comprising about 80 per cent. of the sodium salt of 1-naphthalenemonosulfonic acid (sodium 1-naphthalene sulfonate) and about 20 per cent. of the sodium salts of naphthalene disulfonic acids is mixed with about 205 parts of solid sodium hydroxide (98%), and the mixture is added to an autoclave equipped with an agitator. The autoclave is closed, and the mixture is gradually heated to a reaction temperature of about 280° to 285° C. and is maintained at said reaction temperature until the reaction is complete, which usually requires about 6 hours. Agitation is begun as soon as the mass becomes sufficiently pasty to be stirred. Upon completion of the fusion, the autoclave is cooled to reduce the pressure, hot water is pumped in under pressure, and, after further cooling, the autoclave is opened and additional water is added to complete the solution of the melt. The solution is then filtered to remove solid impurities, the filtrate is heated to a temperature above the melting point of 1-naphthol (e. g., about 75° C.), and dilute sulfuric acid (50° Bé.) is added until the alkalinity of the solution toward phenolphthalein paper just disappears (about 290 parts being required). The 1-naphthol is thereby precipitated in the form of oily globules while the naphthol sulfonic acids are left in solution in the form of their soluble sodium salts. The mass is cooled to a temperature below the melting point of 1-naphthol (e. g., to about 35° C.) to solidify and complete the precipitation of the 1-naphthol, which is then separated by filtration. The filter cake is washed with water until a test with brilliant yellow paper shows no alkaline reaction, and it is then blown for a short time with air.

It will be realized that the invention is not limited to the process and details thereof which are set forth in the foregoing example. Thus, the 1-naphthalenemonosulfonic acid and/or naphthalene disulfonic acid may be employed either in the form of the alkali-metal salt, or salts, or in the form of the free acid; but if the free acid is used sufficient additional caustic alkali is preferably employed to form the alkali-metal salt thereof.

Temperatures of 275° to 310° C. may be employed, the lower temperatures being preferred to the higher temperatures. For optimum results, the fusion is conducted at the lowest temperature at which the mass may be well stirred. The fusion may be carried out in the presence or absence of water but the presence of some water is preferred, inasmuch as it reduces the melting point of the fusion mass and enables a lower temperature to be employed. The period of heating of the reaction mixture may also be varied but a period of about 5½ to 6 hours at a reaction temperature of 280° to 285° C. leads to a maximum yield of 1-naphthol. At a lower temperature, a somewhat longer time is required.

Sodium or potassium hydroxide or a mixture thereof may be employed in the fusion; and the proportion thereof employed relative to the naphthalene sulfonic acid mixture may be varied. The use of too little caustic, however, will lead to difficulty in agitating the melt, and too much caustic may cause substantial formation of dihydroxy-naphthalene compounds. The fusion is preferably conducted with the exclusion of air; for the presence of air in caustic alkali fusions of the type of the present process leads to some decomposition and contamination of the product.

Isolation of 1-naphthol and separation of it from the naphthol sulfonic acids present in the melt in the form of their sodium salts may be effected by the addition of sulfuric acid of any suitable strength, and instead of sulfuric acid, mineral or other acids, e. g. hydrochloric acid, may be used. The use of too strong sulfuric acid, (e. g., 100%) should be avoided, however, since local sulfonation of the product and consequent loss of yield may result during acidification under the temperature conditions employed. The kind and amount of acid used may be varied, but an amount is preferably employed such that the hydrogen ion concentration of the resulting solution expressed in terms of pH lies within the range of about 8 to 9, inclusive. Under such conditions of acid concentration, substantially all of the sodium naphtholate is converted to naphthol while the sodium sulfite and the sodium salts of the naphthol sulfonic acid, and of any unconverted disulfonic acid present, are substantially unaffected and are left in solution. This condition is indicated by the solution's ceasing to react alkaline toward phenolphthalein paper while it still reacts strongly alkaline toward brilliant yellow paper. A greater acidity (i. e., a lower pH value) than about that given above will lead to the formation of bisulfite and cause a loss in yield of naphthol, due to formation of a soluble naphthol sulfite ester.

The temperature of precipitation of the 1-naphthol may be other than that specifically mentioned; but by effecting the precipitation at an elevated temperature, the 1-naphthol separates as oily globules, which on subsequent cooling congeal, with a minimum of occlusion, to readily filterable pellets. In cooling the precipitated 1-naphthol, care should be taken to avoid excessive cooling if sulfuric acid has been employed to liberate the naphthol from the sodium naphtholate, otherwise Glauber's salt may separate and contaminate the product.

Since certain changes may be made in carrying out the above process without departing from the scope of the invention, it is intended that all matter contained in the above description shall be interpreted as illustrative and not in a limiting sense, except as limited by the claims.

I claim:

1. A process for the production of 1-naphthol which comprises fusing a mixture containing 1-naphthalenemonosulfonic acid and a naphthalene disulfonic acid with caustic alkali to form a mixture containing the alkali-metal compounds of 1-naphthol and of a naphthol sulfonic acid but containing substantially no alkali-metal dihydroxy-naphthalene compound, and separating 1-naphthol from said mixture.

2. A process for the production of 1-naphthol which comprises fusing a mixture containing 1-naphthalenemonosulfonic acid and a naphthalene disulfonic acid with caustic alkali to form a mixture of the alkali-metal compounds of 1-naphthol and of a naphthol sulfonic acid, reducing the alkalinity of said mixture, and separating 1-naphthol from the resulting mixture.

3. A process for the production of 1-naphthol which comprises fusing a mixture containing 1-naphthalenemonosulfonic acid and a naphthalene disulfonic acid with sodium hydroxide to form a mixture of the sodium compounds of 1-naphthol and of a naphthol sulfonic acid, acidifying said mixture to an extent adapted to produce a mixture of 1-naphthol and the sodium salt of the naphthol sulfonic acid, and separating 1-naphthol from the acidified mixture.

4. A process for the production of 1-naphthol which comprises fusing a mixture containing 1-naphthalenemonosulfonic acid and a naphthalene disulfonic acid with sodium hydroxide to form a mixture containing the sodium compounds of 1-naphthol and of a naphthol sulfonic acid, acidifying said mixture with sulfuric acid to an extent adapted to produce a mixture of 1-naphthol and the sodium salt of the naphthol sulfonic acid, and separating 1-naphthol from the acidified mixture.

5. A process for the production of 1-naphthol which comprises fusing a mixture containing 1-naphthalenemonosulfonic acid and a naphthalene disulfonic acid with caustic alkali to form a mixture of the alkali-metal compounds of 1-naphthol and of a naphthol sulfonic acid, and converting said mixture of alkali-metal compounds to 1-naphthol and an alkali-metal salt of the naphthol sulfonic acid.

6. A process for the production of 1-naphthol which comprises fusing a mixture containing 1-naphthalenemonosulfonic acid and a naphthalene disulfonic acid with caustic alkali to form a mixture of the alkali-metal compounds of 1-naphthol and of a naphthol sulfonic acid, and treating said mixture with an amount of an acid adapted to convert said alkali-metal compounds to a mixture of 1-naphthol and of a naphthol sulfonic acid which is substantially wholly in the form of its alkali-metal salt.

7. A process for the production of 1-naphthol which comprises fusing a mixture containing 1-naphthalenemonosulfonic acid and a naphthalene disulfonic acid with caustic alkali to form a mixture of the alkali-metal compounds of 1-naphthol and of a naphthol sulfonic acid, which mixture is substantially free from an alkali-metal dihydroxy-naphthalene compound, treating said mixture with such an amount of an acid that the naphthol sulfonic acid compound is converted substantially completely to its monoalkali-metal salt, and separating the 1-naphthol thereby produced.

8. A process for the production of 1-naphthol which comprises fusing a mixture containing 1-naphthalenemonosulfonic acid and a naphthalene disulfonic acid with caustic alkali to form a mixture of the alkali-metal compounds of 1-naphthol and of a naphthol sulfonic acid, acidifying said mixture to an extent adapted to produce a solution of which the pH lies within the range of about 8 to 9, inclusive, and separating the 1-naphthol.

9. A process for the production of 1-naphthol which comprises fusing a mixture containing 1-naphthalenemonosulfonic acid and a naphthalene disulfonic acid with caustic alkali to form a mixture of the alkali-metal compounds of 1-naphthol and of a naphthol sulfonic acid, acidifying said mixture to an extent adapted to produce a solution of which the pH lies within the range of about 8 to 9, inclusive, while maintaining the mixture at a temperature above the melting point of 1-naphthol, cooling the mixture to solidify said 1-naphthol, and separating the solidified 1-naphthol.

10. A process for the production of 1-naphthol which comprises admixing a mixture containing sodium 1-naphthalene sulfonate and a sodium salt of a naphthol disulfonic acid with caustic alkali, heating the admixture in an autoclave at a temperature of about 280° to 285° C. for a period of about 5½ to 6 hours, dissolving the mass in water, heating to a temperature above the melting point of 1-naphthol, adding sulfuric acid in an amount adapted to produce a solution having a pH lying within the range of about 8 to 9, cooling to a temperature below the melting point of 1-naphthol and separating the resulting solidified 1-naphthol by filtration.

11. A process for the production of 1-naphthol which comprises admixing a mixture containing about 80 per cent. of sodium 1-naphthalene sulfonate and about 20 per cent. of the sodium salts of naphthalene disulfonic acids with sodium hydroxide, heating the admixture in an autoclave with agitation in the presence of water at a temperature of about 280° to 285° C. for a period of about 5½ to 6 hours, dissolving the mass in water, heating to a temperature of about 75° C., adding sulfuric acid of about 50° Bé. in an amount adapted to produce a solution having a pH lying within the range of about 8 to 9, cooling to a temperature of about 35° C., and separating the 1-naphthol by filtration.

12. In a process for the production of 1-naphthol, the improvement which comprises acidifying a mixture of alkali-metal compounds of 1-naphthol and of a naphthol sulfonic acid to an extent adapted to produce 1-naphthol and an alkali-metal salt of the naphthol sulfonic acid.

13. In a process for the production of 1-naphthol, the improvement which comprises selectively acidifying a mixture containing alkali-metal compounds of 1-naphthol and of a naphthol sulfonic acid, and an alkali-metal sulfite, to an extent adapted to form 1-naphthol while leaving the alkali-metal sulfite substantially unaffected.

14. In a process for the production of 1-naphthol, the improvement which comprises acidifying a mixture containing the sodium compounds of 1-naphthol and of a naphthol sulfonic acid, and sodium sulfite, to an extent adapted to form a solution of which the pH lies within the range of about 8 to 9, inclusive, and separating the 1-naphthol.

15. In a process for the production of 1-naphthol, the improvement which comprises admixing with a mixture containing the sodium compounds of 1-naphthol and of a naphthol sulfonic acid, and sodium sulfite an amount of acid adapted to form a solution of which the pH lies within the range of about 8 to 9, inclusive, while maintaining the temperature of the mixture above the melting point of 1-naphthol, cooling the mixture to solidify the 1-naphthol, and separating the resulting solidified 1-naphthol.

16. In a process for the production of 1-naphthol, the improvement which comprises admixing with a mixture containing the sodium compounds, of 1-naphthol and of a naphthol sulfonic acid, and sodium sulfite a mineral acid in an amount adapted to form a solution of which the pH lies within the range of about 8 to 9, inclusive, while maintaining the temperature of the mixture above the melting point of 1-naphthol, cooling the mixture to solidify the 1-naphthol, and separating the resulting solidified 1-naphthol.

17. In a process for the production of 1-naphthol, the improvement which comprises fusing a mixture containing 1-naphthalenemonosulfonic acid and a naphthalene disulfonic acid with caustic alkali in an amount adapted to form a mixture containing the alkali-metal compounds of 1-naphthol and of a naphthol sulfonic acid but substantially no alkali-metal dihydroxynaphthalene compound.

18. In a process for the production of 1-naphthal substantially free from 2-naphthol, the improvement which comprises fusing a mixture containing 1-naphthalenemonosulfonic acid and a naphthalenedisulfonic acid, but containing substantially no 2-naphthalenemonosulfonic acid, with caustic alkali in an amount adapted to form a mixture containing the alkali-metal compounds of 1-naphthol and of a naphthol sulfonic acid but substantially no alkali-metal dihydroxynaphthalene compound.

19. A process for the production of 1-naphthol substantially free from 2-naphthol which comprises fusing a mixture containing 1-naphthalenemonosulfonic acid and a naphthalenedisulfonic acid, but containing substantially no 2-naphthalenemonosulfonic acid, with caustic alkali to form a mixture containing the alkali-metal compounds of 1-naphthol and of a naphtholsulfonic acid, but containing substantially no alkali-metal dihydroxy-naphthalene compound, acidifying the mixture to an extent adapted to produce a mixture of 1-naphthol and an alkali-metal salt of the naphthol sulfonic acid, and separating 1-naphthol from the acidified mixture.

20. A process for the production of 1-naphthol which comprises fusing a mixture containing 1-naphthalenemonosulfonic acid and a naphthalene disulfonic acid with caustic alkali to form a mixture of the alkali-metal compounds of 1-naphthol and of a naphthol sulfonic acid, treating a solution of the resulting mixture with a sufficient amount of acid to form 1-naphthol, and separating 1-naphthol from the solution.

21. A process for the production of 1-naphthol which comprises admixing a mixture containing sodium 1-naphthalene sulfonate and a sodium salt of a naphthol disulfonic acid with caustic alkali, heating the admixture in an autoclave at a temperature of about 280° to 285° C. for a period of about 5½ to 6 hours, treating the resulting mixture of sodium compounds with a sufficient amount of acid to form 1-naphthol, and separating 1-naphthol from the treated mixture.

WILLIAM J. COTTON.